United States Patent
Elia

(10) Patent No.: US 10,876,280 B2
(45) Date of Patent: Dec. 29, 2020

(54) DEVICE FOR SEPARATING AND LIFTING SOLIDS FROM WASTE WATER

(71) Applicant: Carmine Elia, Pomezia (IT)

(72) Inventor: Carmine Elia, Pomezia (IT)

( * ) Notice: Subject to any disclaimer, the term of this patent is extended or adjusted under 35 U.S.C. 154(b) by 0 days.

(21) Appl. No.: 16/607,583

(22) PCT Filed: Apr. 23, 2018

(86) PCT No.: PCT/IT2018/000055
§ 371 (c)(1),
(2) Date: Oct. 23, 2019

(87) PCT Pub. No.: WO2018/198146
PCT Pub. Date: Nov. 1, 2018

(65) Prior Publication Data
US 2020/0149263 A1    May 14, 2020

(30) Foreign Application Priority Data
Apr. 24, 2017    (IT) .......................... 102017000044534

(51) Int. Cl.
*E03F 5/14*        (2006.01)
*B01D 29/01*       (2006.01)
(Continued)

(52) U.S. Cl.
CPC .............. *E03F 5/14* (2013.01); *B01D 29/014* (2013.01); *B01D 29/05* (2013.01); *B01D 29/23* (2013.01);
(Continued)

(58) Field of Classification Search
CPC . E03F 5/14; E02B 8/023; E02B 8/026; B01D 29/014; B01D 29/071; B01D 29/23;
(Continued)

(56) References Cited

U.S. PATENT DOCUMENTS

| | | | |
|---|---|---|---|
| 4,634,524 A | 1/1987 | Huber | |
| 4,836,919 A | * 6/1989 | Huber | ...................... E03F 5/14 |
| | | | 210/159 |

(Continued)

FOREIGN PATENT DOCUMENTS

| | | | |
|---|---|---|---|
| DE | 30 19 127 | | 11/1981 |
| DE | 4042167 | * | 7/1991 |
| EP | 2 921 458 | | 1/2017 |

OTHER PUBLICATIONS

International Search Report dated Aug. 6, 2018 in International (PCT) Application No. PCT/IT2018/000055.

*Primary Examiner* — Christopher Upton
(74) *Attorney, Agent, or Firm* — Wenderoth, Lind & Ponack, L.L.P.

(57) ABSTRACT

A device for separating and lifting solids from waste water has a stationary drum provided with a first filter screen and a screw conveyor. An auger shaft has a lower portion located inside the stationary drum, which is partially surrounded by a second filter screen. The lower portion is connected to a cleaning apparatus of the first filter screen formed by a plurality of comb-holder arms mounted on a cross shaped element. The comb-holder arms are integral at the opposite end to an anti-skid ring sliding in a sliding seat integral with the support frame. Each comb-holder arm has an elongated comb facing the first filter screen and in contact with the first filter screen. The comb-holder arms are connected to the auger shaft by an epicyclic secondary gear.

8 Claims, 5 Drawing Sheets

(51) Int. Cl.
*B01D 29/05* (2006.01)
*B01D 29/23* (2006.01)
*B01D 29/52* (2006.01)
*B01D 29/64* (2006.01)
*B01D 29/68* (2006.01)
*B01D 29/82* (2006.01)
*E02B 8/02* (2006.01)

(52) U.S. Cl.
CPC ......... *B01D 29/52* (2013.01); *B01D 29/6476* (2013.01); *B01D 29/68* (2013.01); *B01D 29/828* (2013.01); *E02B 8/026* (2013.01)

(58) Field of Classification Search
CPC ... B01D 29/6476; B01D 29/68; B01D 29/828
USPC ................ 210/159, 162, 298, 332, 408, 415
See application file for complete search history.

(56) References Cited

U.S. PATENT DOCUMENTS 5,593,597 A * 1/1997 Bischof ............... E03F 5/14
 210/158
7,160,443 B2 * 1/2007 Frommann ............ E03F 5/14
 210/159

* cited by examiner

DEVICE FOR SEPARATING AND LIFTING SOLIDS FROM WASTE WATER

TECHNICAL FIELD

The present invention relates to a device for separating and lifting solids, in particular, from waste water. The device according to the present invention comprises a support frame supporting a drum provided with an inlet mouth to be immersed in a channel or in a tank for collecting water to be treated, and an outlet mouth. The drum, which is cylindrical, is delimited by a filter screen. The drum is combined with a coaxial screw conveyor having a lower portion located inside the drum, and an upper portion from which the solid fraction taken away from the waste water exits. The filter screen is adapted to let the liquid fraction of the water flow out downstream of the separating and lifting device.

BACKGROUND ART

As shown in EP 2 921 458 A1, a drawback encountered in such devices is due to the fact that, in order to ensure that in the purified waters downstream of the separating device the solid fraction does not exceed a certain particle size or quantity, the filter screen must have openings of reduced dimensions, However, the reduced dimensions of the openings can result in their obstruction. EP 2 921 458 A1 tries to solve this drawback with a rotary drum provided with a first filter screen inside which there is a second filter screen always associated with the support frame and provided with holes with a diameter greater than those of the first filter screen. However, the rotating drum is driven by a separate motor from that of the screw conveyor, and a consequent increase in manufacturing costs and energy consumption to allow rotation of the rotating drum occurs.

Further, U.S. Pat. No. 4,634,524 provides a screw conveyor with a rotating drum and internal partitions integral with it. A brush provides a cleaning action from the outside. U.S. Pat. No. 4,634,524 employs for the rotation of the rotating drum the same motor that drives the screw conveyor, with a drawback that both have the same number of revolutions. As a result, the rotating drum has an improper speed in performing its function.

For this reason, the present invention provides a separating and lifting device equipped with a drum carrying the first filter screen of a stationary type.

DE 30 19 127 A1 has a stationary drum made of inwardly projecting equally spaced circumferential discs, and combs with teeth inserted between the circumferential discs and rotating at the same speed as the auger shaft. The solid material recovered from the combs ends up in the funnel slot where the auger shaft is located.

DE 30 19 127 A1 has a drawback that the combs rotate at the same speed as the auger shaft, which rotation speed of the combs is excessive in a cleaning operation. Moreover, the discs have an interspace between one another too high to obtain a small particle size filtration of the solid fraction.

Although it is noticeably different in the form of the filter screen of the stationary drum, DE 30 19 127 A1 is to be considered the document closest to the present invention, because it has combs that scrap the stationary filtering drum on the inside. However, the combs are made of a particular structure which matches the shape of the filter screen, and a device for cleaning them is not provided. Furthermore, since the combs are moved directly from the auger shaft, they are forced to rotate at its speed.

SUMMARY OF THE INVENTION

The present invention aims to overcome the aforementioned drawbacks.

In particular, an object of the present invention is to obtain an adequate automatic cleaning of the filter screen of a device for separating and lifting solids from waste water during its operation by cleansing members.

Furthermore, an object of the invention is to accentuate the degree of automatic cleaning by improving the periodic cleaning of the cleansing members.

A further object of the invention is to adjust the rotation speed of the cleansing members in order to obtain an optimum automatic cleaning.

BRIEF DESCRIPTION OF DRAWINGS

Further features and advantages of the present invention will become mostly clear from the indicative, and therefore not limiting, description of two embodiments of a device for separating and lifting solids from waste water, as illustrated in the accompanying drawings, in which.

DESCRIPTION OF EMBODIMENTS OF THE INVENTION

Figure 1:
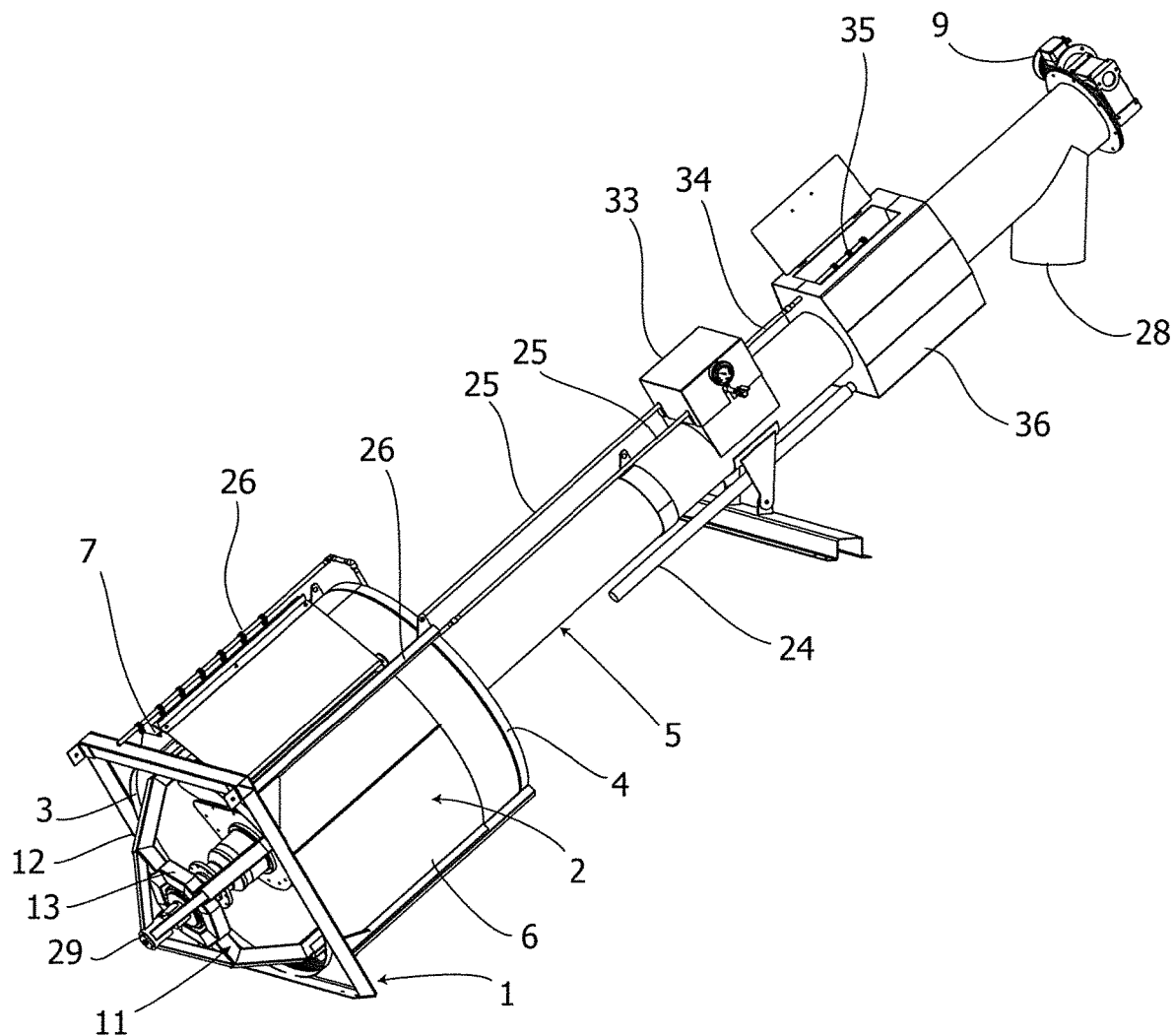
FIG. 1 is a perspective view of a first embodiment of a device for separating and lifting solids from waste water according to the invention.
Figure 2:
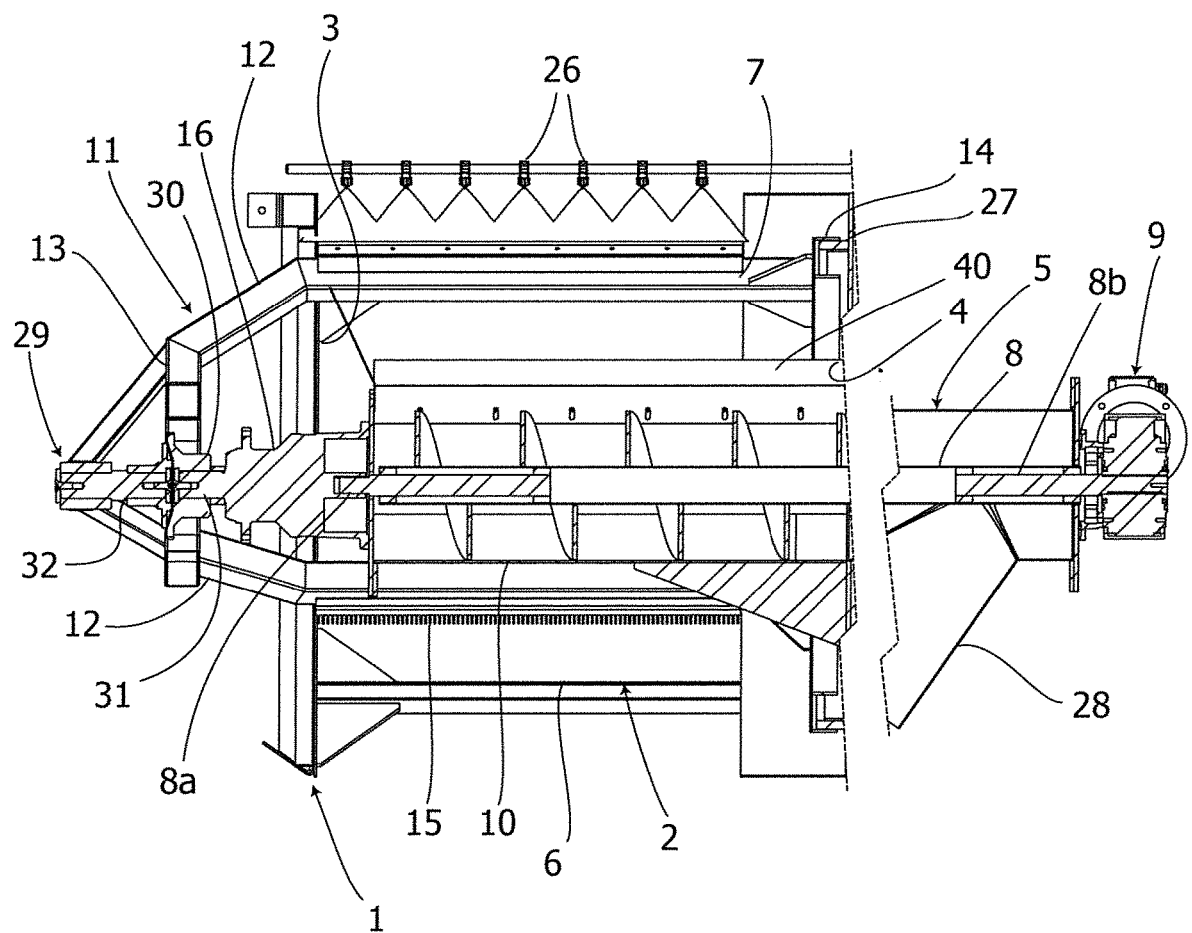
FIG. 2 is a partial central longitudinal cross-section view of the device in FIG. 1.

First, reference is made to FIG. 1 which is a perspective view of a first embodiment of a device for separating and lifting solids, in particular, from waste water according to the invention, and to FIG. 2 which is a partial central longitudinal cross-section view thereof. The device comprises a support frame 1 supporting a stationary drum 2 provided with an inlet mouth 3 to be immersed in the water to be treated, and an outlet mouth 4, and a screw conveyor 5. The tank or channel with the water to be treated is not shown, because the inclined arrangement of this type of device is known. Its horizontal position in FIG. 2, with relative cuts, is provided only for clarity of representation. The stationary drum 2 has peripherally a first filter screen 6 having an upper opening 7. The screw conveyor 5 has an auger shaft 8 driven by a primary gear motor 9. A lower portion 8a of the auger shaft 8 is located inside the stationary drum 2, and an upper portion 8b of the auger shaft causes the solid fraction withdrawn from the waste water to escape through a discharge opening 28. The lower portion 8a of the auger shaft 8 inside the stationary drum 2 is partially surrounded by a second filter screen 10. The second filter screen 10 has through openings of a width greater than those of the first filter screen 6.

Figure 3:
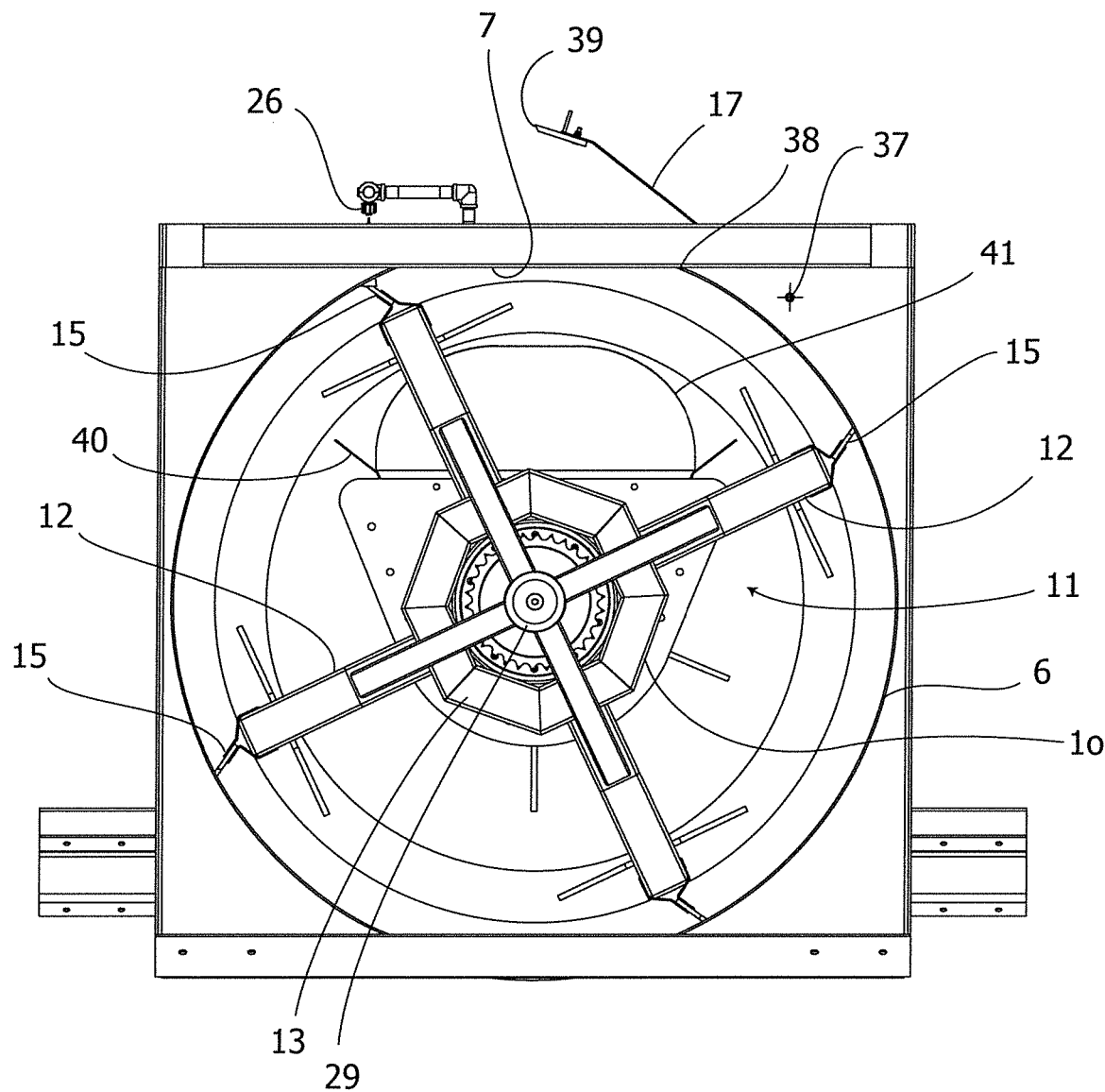
FIG. 3 is a front end view of the device in FIG. 1.
Figure 4:
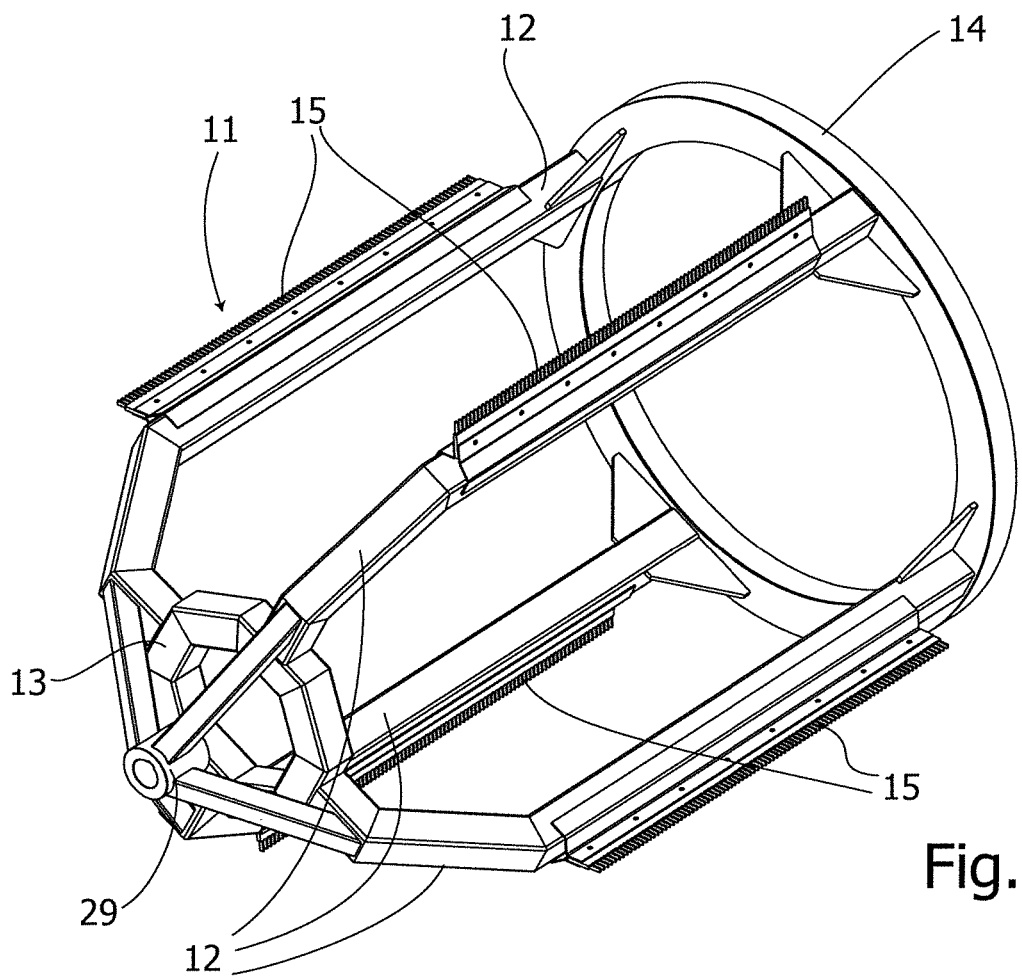
FIGS. 4 and 5 are a perspective view and a plan view from above, on a reduced scale, respectively, of the apparatus for cleaning the device in FIG. 1.
Figure 5:
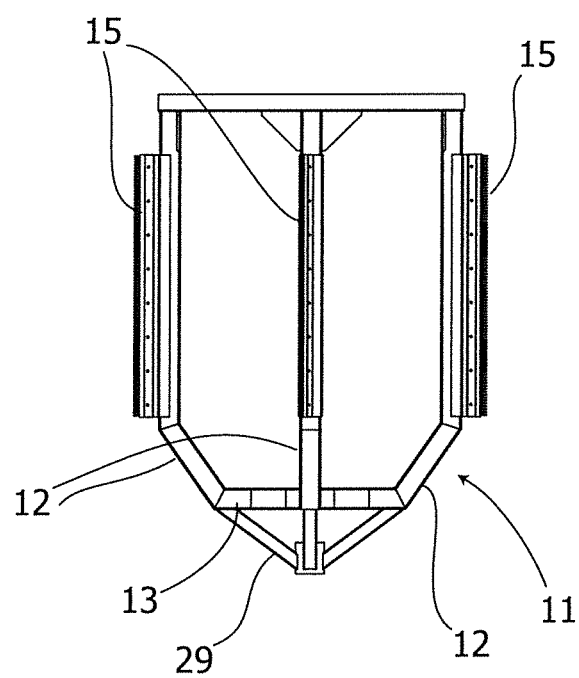

The lower portion 8a of the auger shaft 8 is connected to a cleaning apparatus 11 of the first filter screen 6. The cleaning apparatus 11 is formed by a plurality of comb-holder arms 12, four in the embodiment described. Reference is made now also to FIGS. 3 to 5, which are a front end view of the device of FIG. 1, a perspective view and a top view, on a reduced scale, respectively, of the cleaning apparatus 11 of the device in FIG. 1. The comb-holder arms 12 are mounted on a cross shaped element 13 and terminate, at one of their front ends, in a front coupling 29 with an extension of the auger shaft 8, as described below. It is shown in FIG. 2 that, at their opposite end, i.e. the rear end, the comb-holder arms 12 are integral with an anti-skid ring 14 mounted rotatably on a sliding seat 27, preferably coated with Teflon. Each comb-holder arm 12 has a comb 15 facing the first filter screen 6 and in contact with it.

Provided on the lower portion 8a of the auger shaft 8 there is a schematically shown epicyclic secondary reduction gear 16, whose output shaft 31 passing through the cross shaped element 13 is joined by a clutch or torque limiter 30 with a shaft section 32 on which the comb-holder arms 12 with the coupling 29 are keyed. This arrangement allows reduction of the speed of the cleaning apparatus 11 with respect to the speed of the auger shaft 8 and limits the occurrence of breakages in the event of a jamming of a comb-holder arm 12.

Referring again also to FIG. 1, a brush washing system is shown in the device according to the present invention. It comprises a pipe 24 (shown only partially) for purified water withdrawal, a pump 33, a pair of front delivery pipes 25, and a rear delivery pipe 34. The front delivery pipes 25 bring the purified water to a couple of multiple spray conveyors 26 located on the support frame 1 between the inlet mouth 3 and the outlet mouth 4 above the upper opening 7 of the first filter screen 6. The rear delivery pipe 34 carries purified water to nozzles 35 for washing the grilled material in a compartment 36. The spray conveyors 26 for washing the combs 15 serve to clean the combs 15 as they pass under the spray conveyors 26. However, a comb cleansing member cleans the combs 15.

With reference in particular to FIGS. 1 and 3, a first embodiment of a comb cleansing member indicated as 17 is shown. The comb cleansing member 17 is substantially a pivoting plate hinged in a pin 37 on the support frame 1. In the figures, the comb cleansing member 17 is shown raised but in its operation the comb cleansing member 17 rests on the first filter screen 6 on its end 38 (FIG. 3) adjacent to the upper opening 7. In this way, when the combs 15 rotate clockwise, as shown in FIG. 3, the corresponding combs come into contact with the end 39 of the comb cleansing member 17 and are deprived of any solid material attached thereto. This material falls into a hopper 40 bounded in front by a wall 41 which, together with the second filter screen 10, surrounds the lower portion 8a of the auger shaft 8 below.

Figure 6:
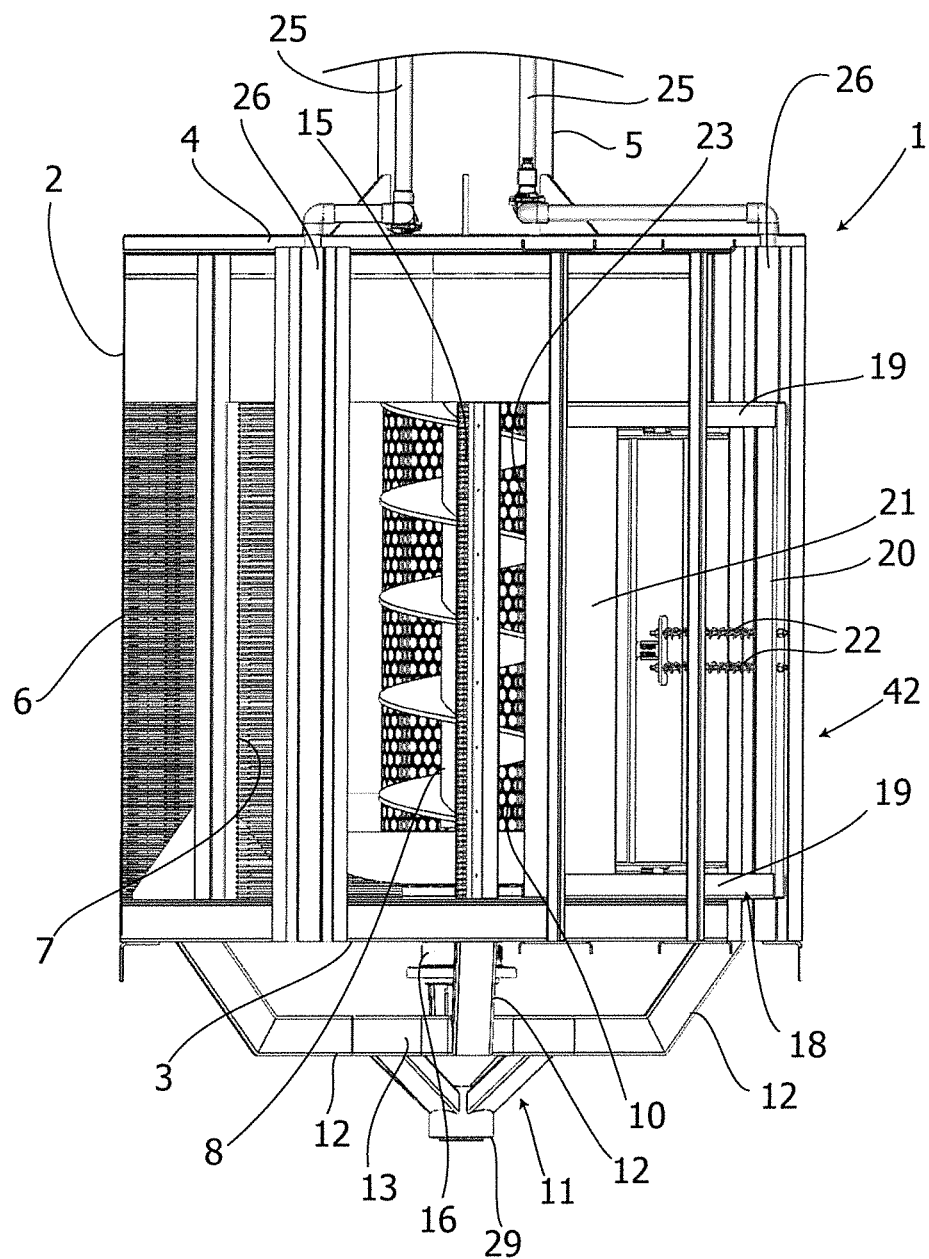
FIG. 6 is a partial plan view of a second embodiment of the device for separating and lifting solids from waste water according to the invention.

Reference is made now to FIG. 6 which is a partial plan view of a second embodiment of the device for separating and lifting solids from waste water according to the invention. Equal reference numbers represent parts that are the same or similar to those of the first embodiment shown in FIGS. 1 to 3. In this second embodiment, the comb cleansing member is marked with 42. Analogously to the tilting plate of the comb cleansing member 17 in the first embodiment, the comb cleansing member 42 has a secant arrangement with respect to the stationary drum 2 and faces the upper opening 7. The comb cleansing member 42 comprises a C-shaped frame 18 placed on the support frame 1 between the inlet mouth 3 and the outlet mouth 4 of the stationary drum 2. The frame 18 has wings 19 of the C shape which constitute sliding guides. The core 20 of the C shape of the frame 18 is a supporting element of the sliding guides formed by the wings 19 of the C shape. A slide 21 slidable in the wings 19 of the C shape is spring loaded against the core of the C shape by means of a couple of springs 22 attested on guide rods. The slide 21 has a front end 23 which comes into contact periodically with the combs 15 during their rotation. This contact drops the solid fraction carried by the combs 15 over the second filter screen 10, underneath the lower portion 8a of the auger shaft 8, as already described for the first embodiment.

The invention claimed is:

1. A device for separating and lifting solids from waste water, the device comprising:
   a support frame supporting a stationary drum having a first filter screen provided with an upper opening, an inlet mouth to be immersed in the water to be treated, and an outlet mouth, and
   a screw conveyor having an auger shaft driven by a primary gear motor, the auger shaft having an auger shaft lower portion located inside the stationary drum and an auger shaft upper portion configured to remove a solid fraction drawn from the wastewater through a discharge opening, the auger shaft lower portion inside the stationary drum being partially surrounded by a second filter screen with passage openings of a width greater than openings of the first filter screen, the auger shaft lower portion being connected to a cleaning device for cleaning the first filter screen,
   wherein the first filter screen cleaning device is formed by a plurality of comb-holder arms mounted anteriorly on a cross shaped element and posteriorly integral with a support frame, each of the comb-holder arms having an elongated comb facing the first filter screen and in contact with the first filter screen t, a secondary gear being in the auger shaft lower portion and having an exit shaft to which the comb-holder arms are keyed in a front coupling.

2. The device according to claim 1, wherein the secondary gear is epicyclic.

3. The device according to claim 1, wherein a torque limiter or friction clutch is interposed between the secondary gear and the front coupling of the comb-holder arms.

4. The device according to claim 1, wherein the support frame externally supports a comb cleansing member in engagement with the elongated combs in a position above the second filter screen.

5. The device according to claim 4, wherein the comb cleansing member is a tilting plate hinged to a pin on the support frame, and resting on the first filter screen adjacent to the upper opening so that, when the combs rotate, they come into contact with the comb cleansing member so that any solid material possibly attached to the combs is removed and falls into the second filter screen surrounding the auger shaft lower portion at the bottom.

6. The device according to claim 4, wherein the comb cleansing member comprises a C-shaped framework placed on the support frame between the inlet mouth and the outlet mouth of the stationary drum, wings of the C-shaped framework forming sliding guides and a core of the C-shaped framework being a support element for the sliding guides, and a slide sliding into the wings being spring loaded against the core, the slide having a front end configured to come into contact periodically with the elongated combs during rotation of the combs so as to drop the solid fraction, brought by the combs, on the second filter screen surrounding the auger shaft at the bottom.

7. The device according to claim 1, further comprising a comb washing system comprising a purified water drawing pipe downstream of the stationary drum, a pump to be driven by the primary gear motor, and two front delivery pipes configured to deliver cleaned water to a pair of spray conveyors located on the support frame between the inlet mouth and the outlet mouth above the upper opening of the first filter screen.

8. The device according to claim 1, further comprising a rear delivery pipe configured to deliver cleaned water to nozzles for washing screened material in a compartment of the screw conveyor.

\* \* \* \* \*